(12) United States Patent
Weiss

(10) Patent No.: US 7,154,243 B2
(45) Date of Patent: Dec. 26, 2006

(54) ROTARY INDEXING TABLE

(75) Inventor: Dieter Weiss, Wallduern (DE)

(73) Assignee: Weiss GmbH Sondermaschinentechnik, Buchen/Odenwald (DE)

( * ) Notice: Subject to any disclaimer, the term of this patent is extended or adjusted under 35 U.S.C. 154(b) by 419 days.

(21) Appl. No.: 10/769,552

(22) Filed: Jan. 30, 2004

(65) Prior Publication Data

US 2004/0251867 A1    Dec. 16, 2004

(30) Foreign Application Priority Data

Feb. 4, 2003    (DE)    ................ 103 04 462

(51) Int. Cl.
*B23Q 16/06*    (2006.01)
*B23Q 16/10*    (2006.01)

(52) U.S. Cl. .............. 318/560; 318/649; 74/813 R; 74/813 C; 29/38 B; 29/48.5; 33/569

(58) Field of Classification Search .............. None
See application file for complete search history.

(56) References Cited

U.S. PATENT DOCUMENTS

| | | | | |
|---|---|---|---|---|
| 4,163,313 A | * | 8/1979 | Matsuno et al. ............ 29/563 |
| 4,473,930 A | * | 10/1984 | Bezner et al. ............ 29/38 C |
| 4,491,769 A | * | 1/1985 | Heidelberg ................ 318/254 |
| 4,788,477 A | * | 11/1988 | Teramachi ................ 318/315 |
| 4,866,630 A | * | 9/1989 | Beaman et al. ............ 700/160 |
| 5,540,120 A | * | 7/1996 | Sommer .................. 74/813 R |
| 5,666,038 A | * | 9/1997 | Ohishi ...................... 318/625 |
| 5,682,658 A | * | 11/1997 | Roseliep ................ 29/48.5 A |
| 5,815,902 A | * | 10/1998 | Osterried et al. .......... 29/38 A |
| 5,860,332 A | * | 1/1999 | Scholler ................ 74/813 L |
| 5,921,170 A | * | 7/1999 | Khatchadourian et al. .... 99/349 |
| 6,137,204 A | * | 10/2000 | Kuwahara ................ 310/254 |
| 6,178,608 B1 | | 1/2001 | Koch |
| 6,220,116 B1 | * | 4/2001 | Warner .................... 74/813 C |
| 6,442,851 B1 | | 9/2002 | Botos et al. |
| 6,813,822 B1 | * | 11/2004 | Baldini et al. ............. 29/563 |
| 6,948,720 B1 | * | 9/2005 | Carlson ..................... 279/5 |
| 6,992,407 B1 | * | 1/2006 | Kano et al. ................ 310/10 |
| 2002/0050804 A1 | * | 5/2002 | Joong et al. ............. 318/649 |
| 2002/0195984 A1 | * | 12/2002 | Joong et al. ............. 318/649 |

FOREIGN PATENT DOCUMENTS

| | | |
|---|---|---|
| EP | 0796700 A2 | 9/1997 |
| JP | 56081405 A * | 7/1981 |
| WO | WO 00/49701 A1 | 8/2000 |

* cited by examiner

*Primary Examiner*—Lincoln Donovan
*Assistant Examiner*—Eduardo Colon Santana
(74) *Attorney, Agent, or Firm*—Townsend and Townsend and Crew LLP; J. Georg Seka; Patrick J. Zhang

(57) ABSTRACT

The invention relates to a rotary indexing table comprising a stationary base unit and a plate rotatably supported thereon and drivable relative to the base unit by means of a drive, in which the drive is formed by a plurality of individual drive elements arranged in the circumferential region of the plate.

11 Claims, 3 Drawing Sheets

ROTARY INDEXING TABLE

BACKGROUND OF THE INVENTION

The invention relates to a rotary indexing table comprising a stationary base unit and a plate rotatably supported thereon and drivable relative to the base unit by means of a drive.

Such rotary indexing tables, as are known in various embodiments from the prior art, serve, for example, to transport a plurality of workpieces held on the plate or on structures arranged thereon in each case by a rotation of the plate from one working or mounting station further to a next working or mounting station.

Known rotary indexing tables with a direct drive customarily have a drive unit provided at a suitable position which can, for example, consist of an electric motor which must apply substantial torques, in particular with large plate diameters of the structures. For this purpose, it is necessary for motors with a relatively high power consumption to be used which require a relatively complex cooling system such as a water cooling system, on the one hand, and whose procurement is associated with a disadvantageously high economic cost, on the other hand.

SUMMARY OF THE INVENTION

An object of the present invention consists of providing a rotary indexing table of the initially named kind which, in particular to the extent its drive unit is affected, can be realized with a comparatively low economic effort. The drive should preferably require such a low power consumption that a cost-favorable air cooling system is possible.

In accordance with the invention, this object is satisfied in that the drive is formed by a plurality of individual drive elements arranged in the circumferential region of the plate.

The object is achieved by a surprisingly easy measure, which was not, however, used in known rotary indexing tables to date. Instead of an individual, relatively powerful drive element, a plurality of individual drive elements are used which can be made correspondingly less powerful and which accordingly also cause a lower power consumption and, resulting from this, also a lower heat production. These advantages are also achieved in accordance with the invention in that the individual drive elements are not, for instance, arranged in the region of the axis of rotation of the plate, but rather in its circumferential region so that, on the operation of the rotary indexing table in accordance with the invention, comparatively low tangential forces produced in the region of the individual drive elements produce large torques. The individual drive elements can thereby be kept small, which then—as already mentioned—results in an advantageously low power consumption and an accordingly low heat development.

In accordance with the invention, a plurality of smaller, cost-favorable individual drive elements can therefore be used whose total procurement costs lie under the procurement costs of a single, comparatively large drive element for previously known rotary indexing tables. It is furthermore possible in accordance with the invention, due to the low heat development, only to use a cost-favorable air cooling system on the individual drive elements so that previously required, complex cooling methods can be omitted.

It is of advantage for the individual drive elements to be arranged in equal distribution at least over part of the circumference of the plate, with them lying substantially diametrically opposite one another in particular with respect to the axis of rotation. In such an arrangement, the radial forces produced by the individual drive elements are largely canceled out by the respectively oppositely disposed individual drive element without the bearing of the rotary indexing table being significantly strained.

The individual drive elements can, for example, be formed as electric motors each provided with a toothed wheel, with the toothed wheels engaging into a turntable connected to the plate. In this case, however, mechanical transmission elements are required, namely toothed wheels and a turntable, so that it is preferred for the plate to be provided along its total circumference with individual permanent magnets adjacent to one another which cooperate with electromagnets attached to the base unit, with these electromagnets lying opposite the permanent magnets coupled to the plate. The latter embodiment of the individual drive elements can be realized in a particularly cost-favorable manner and furthermore has the advantage that no mechanical connection has to be provided between the base unit and the plate—and accordingly also no mechanical transmission element—in the region of the individual drive elements since the forces to be applied to the plate can be transmitted in a non-contact manner as electromagnetic forces. Such an electromagnetic drive works largely wear-free in comparison with a gear drive, whereby the service life of the individual drive elements can be substantially increased in an advantageous manner.

The individual drive elements provided in accordance with the invention are preferably acted on by an air cooling system, with a respective air cooling element being provided, for example, for each half of the individual drive elements arranged in the circumferential region of the plate. It is of technical construction advantage in this process for the two air cooling elements to be provided adjacent to one another and for either a single, joint exhaust air aperture or a respective separate exhaust air aperture to be associated with both air cooling elements. The air cooling elements and the exhaust air apertures can, in this process, be arranged lying substantially diametrically opposite one another with respect to the axis of rotation of the plate so that it is ensured that substantially the total circumferential region of the plate is uniformly vented.

To determine the respective position of the plate relative to the base unit and to communicate corresponding information, for example, to a control computer, it is of advantage for an encoder to be provided for the determination of the relative position between the plate and the base unit. Such an encoder can work, for example, with code markings attached to the plate and distributed over its circumference. These code markings can be made either the same as one another or different to one another, with it being advantageous with code markings the same as one another for at least one reference mark to be provided in the region of the code markings so that not only relative movements between the plate and the base unit can be determined, but also an absolute angular position of the plate can be determined. To detect the code markings or reference marks, the base unit is provided with an optical, magnetic or inductive sensor.

It is furthermore of advantage for the base unit to have a brake unit which cooperates with the plate, is in particular acted on by compressed air and by means of which a rotational movement of the plate can be braked immediately and completely, in particular when an emergency occurs. It is preferred in this process for the brake unit to be in its state permitting a rotation of the plate when the compressed air load is present. In this case, namely on a sudden loss of compressed air, for example, a braking of the plate is triggered.

The plate and the base unit can each be made in ring shape, with the central openings of the plate and of the base unit being substantially aligned with one another. This makes it possible for workpieces arranged on the plate to be worked not only starting from the circumferential region of the plate, but also starting from the openings, since working apparatuses can be provided both in the circumferential region of the plate and in the region of the openings.

It is finally preferred for the plate to be supported rotatably via a wire four-point bearing on the base unit irrespective of whether it is circular or in the form of a circular ring. Such a bearing is particularly easily suited to transmit radial forces, tangential forces and vertical forces between the plate and the base unit.

Further embodiments of the methods are described in the following detailed description and drawings.

BRIEF DESCRIPTION OF THE DRAWINGS

The invention will be described in the following with reference to the drawings.

DESCRIPTION OF THE PREFERRED EMBODIMENTS

Figure 1:
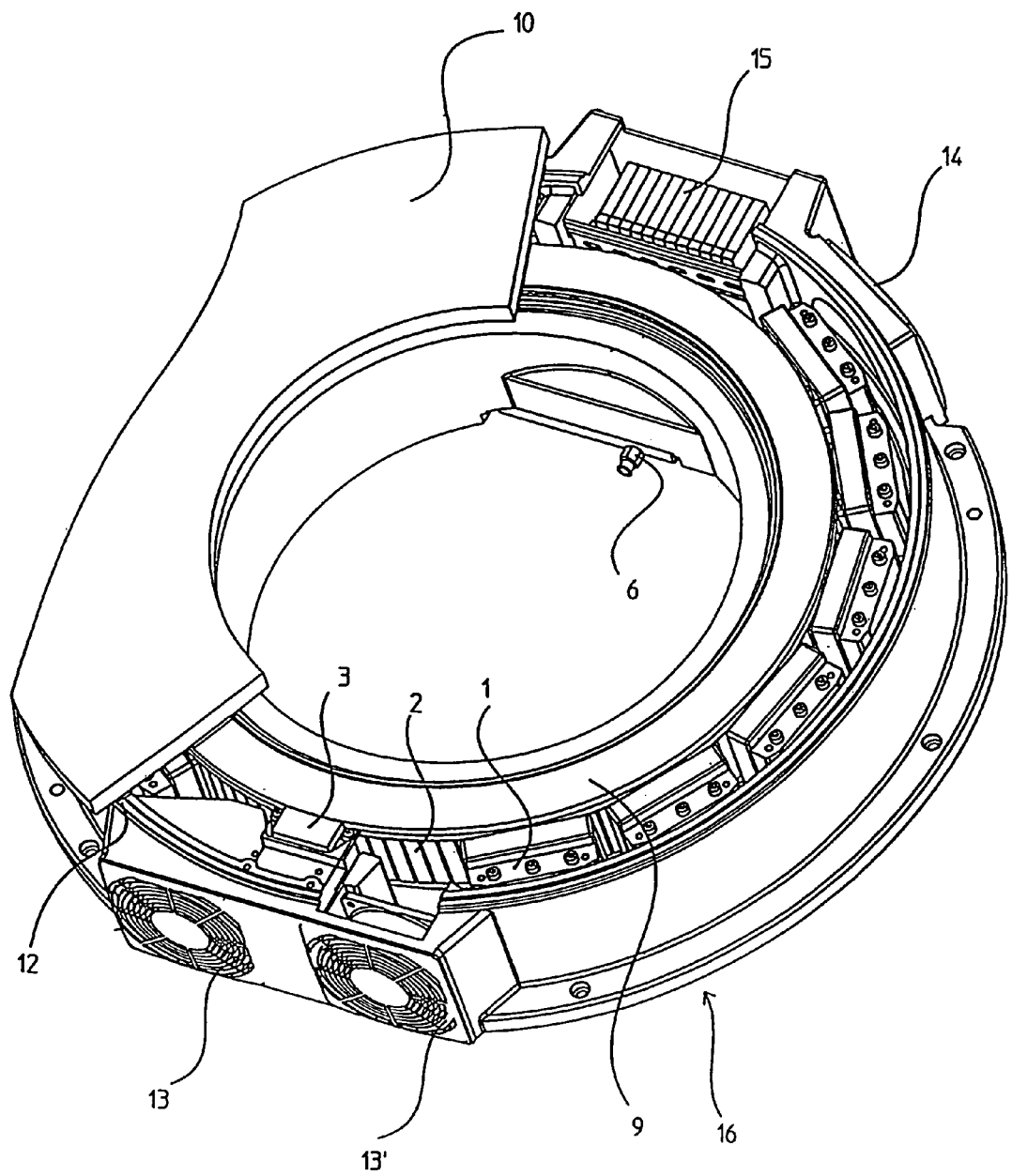
FIG. 1 is a three-dimensional view of a possible embodiment of a rotary indexing table in accordance with the invention in which the plate has been left out regionally in order to make the interior of the rotary indexing table visible.

FIG. 1 shows a rotary indexing table comprising a plate 10 which is made in circular ring shape, is only shown regionally in FIG. 1 and is rigidly connected to a ring element 9, with the ring element 9 being located completely beneath the plate 10. A corresponding arrangement is visible from FIG. 2 which shows a section through an arrangement in accordance with FIG. 1, with joint reference being made in the following to FIGS. 1 and 2.

The ring element 9 with the plate 10 is rotatably supported on a base unit 16, with the base unit 16 i.a. having a ring-shaped support profile 17 (FIG. 2) to which the further elements of the base unit 16 are attached. The central opening of the support section 17 is approximately as large as the central opening of the plate 10.

A wire four-point bearing 8 is formed between the support section 17 and the ring 9 and consists of four wires 18 which extend in circular form and parallel to one another and are arranged so that they form a cage for balls 19 arranged inside these wires 18. Such wire four-point bearings 8 are particularly well-suited to transmit forces acting both vertically, that is, parallel to the axis of rotation of the plate 10, and radially to the plate 10 between the ring element 9 and the support section 17.

Figure 2:
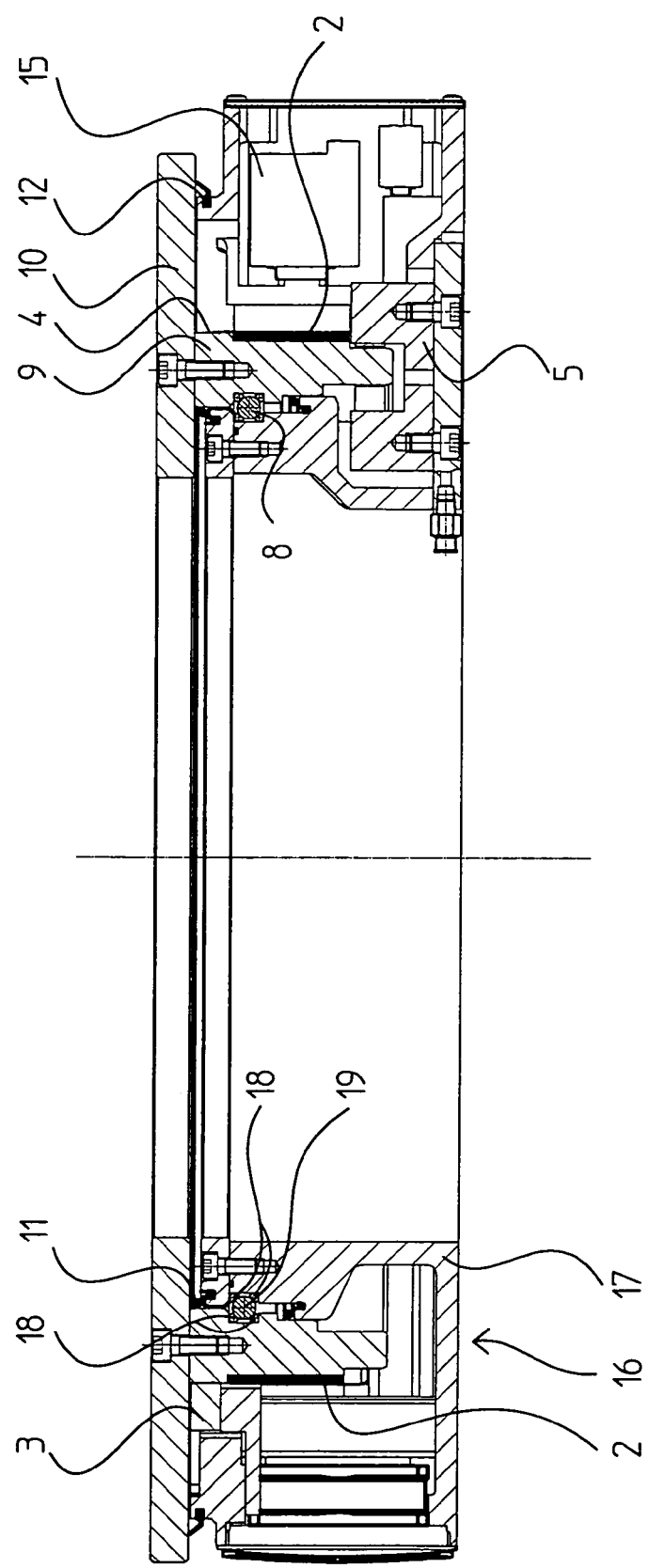
FIG. 2 illustrates a section through a rotary indexing table in accordance with FIG. 1.

The dimensions of the rotary indexing table shown in FIGS. 1 and 2 have been selected so that the diameter of the central opening of the plate 10 and of the support section 17 is approximately half as large as the total diameter of the rotary indexing table shown. The vertical extent of the rotary indexing table amounts to somewhat less than a quarter of its diameter. In other embodiments of the rotary indexing table in accordance with the invention, however, any desired other size ratios can be realized depending on the application case.

Seals 11, 12 are formed between the plate 10 and the base unit 16 and prevent penetration of contamination into the interior of the rotary indexing table and an escape of lubricants from the bearing 8.

Individual permanent magnets 2 which are uniformly distributed adjacent to one another are provided in the circumferential region of the ring element 9 and are each made in bar shape and extend parallel to the axis of rotation of the plate 10. A plurality of electromagnets 1, for example twelve, are provided outside the ring element 9, opposite the permanent magnets 2, and six pieces of them are shown in total in FIG. 1. The electromagnets 1 are arranged substantially uniformly distributed in two drive regions of the outer circumference of the ring element 9, with the two drive regions each extending over somewhat less than 180°, but over much more than 90° of the circumference of the ring element 9. In this process, the electromagnets 1 are fixedly connected to the base unit 16 and are arranged so that they can cooperate with the bar-shaped permanent magnets 2 which are fastened to the rotatable ring element 9. In other larger embodiments of the invention, it is possible without problem to provide twenty or more electromagnets 1.

The ring element 9 is provided above the permanent magnets 2 with code markings 4 (FIG. 2) which are arranged adjacent to one another and which pass a measuring head 3 on a rotation of the plate 10 or of the ring element 9, the measuring head being fixedly connected to the base unit 16. The measuring head 3 can be made as an optical, a magnetic or as an inductive sensor. Since the code markings 4 i.a. also include at least one reference mark, the respective position of the plate 10 can be absolutely determined via the measuring head 3.

The measuring head 3, like two fans 13, 13' adjacent to it, is provided in a circumferential region of the support section 17 in which no electromagnets 1 are arranged. The two fans 13, 13' are each approximately associated with a semi-ring space of the rotary indexing table shown in FIGS. 1 and 2 so that each fan 13, 13' ventilates a total of six electromagnets 1 in each of one of the aforesaid drive regions.

A further circumferential region of the support section 17 is provided opposite the fans 13, 13' and the measuring head 3 and no electromagnets 1 are present in it. An energy supply 15 is provided in this region via which the electromagnets 1 can be supplied with energy. One exhaust air aperture 14 each is provided at both sides of the energy supply 15 and is in each case suitable for transporting away the air sucked in by a fan 13, 13'. Only one of these two exhaust air apertures 14 can be seen in FIG. 1 due to the only partially not shown plate 10.

A compressed air connection 6 (FIG. 1) is furthermore located in that region of the rotary indexing table in which the energy supply 15 is provided and compressed air can be supplied via it to a brake unit 5 which is associated with the ring element 9 in the region of the energy supply 15. On being loaded with compressed air, the brake unit 5 releases the ring element 9 so that it can rotate freely with respect to the base unit 16. On a drop of compressed air, the ring element 9 is braked by brake shoes of the brake unit 5.

Figure 3:
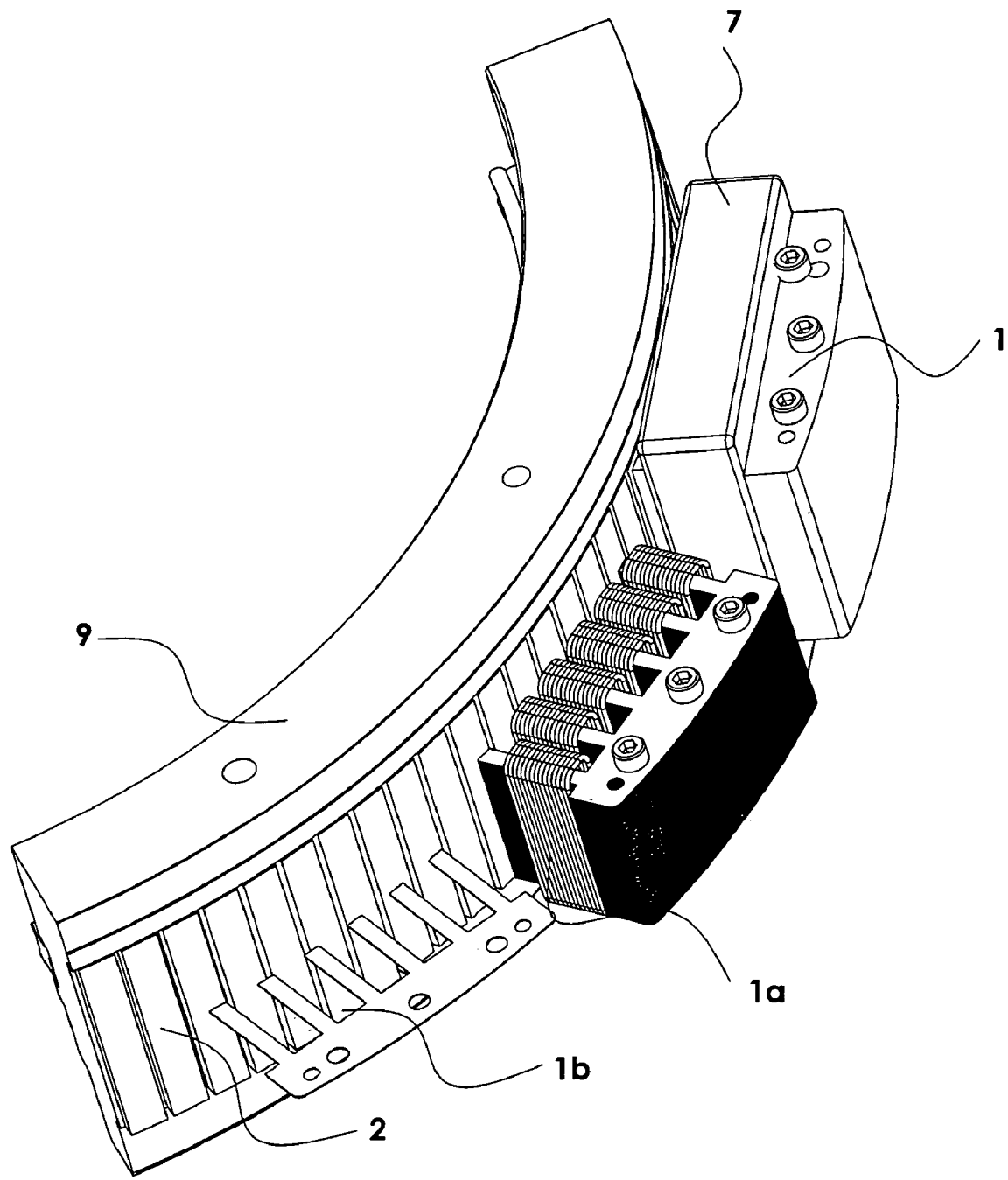
FIG. 3 is a three-dimensional view of a region of a ring element supporting the plate with individual drive elements arranged thereon.

FIG. 3 shows a section of the ring element 9 with permanent magnets 2 arranged thereon. A multiple of motor metal sheets 1b are provided opposite the permanent magnets 2 and are each connected to the base unit 16 in a manner not shown. One electromagnet 1 each with a motor winding 1a is fastened on each of these motor metal sheets. To better illustrate this design, a motor metal sheet 1b is shown in FIG. 3 without an electromagnet 1 fastened thereto and an electromagnet 1 is shown with and without a housing 7.

On operation of the rotary indexing table shown in FIGS. 1 to 3, all electromagnets 1 are charged with current via the energy supply 15 so that a rotation of the ring element 9 or of the plate 10 is triggered with respect to the base unit 16 due to the electromagnetic forces between the electromagnet 1 and the permanent magnets 2. The respectively desired angular step can be determined via the measuring head 3, for example in that a charging of the electromagnetic 1 is interrupted by a control unit (not shown) as soon as the angular step desired and determined by the measuring head 3 has been carried out.

Due to the provision in accordance with the invention of a plurality of electromagnets, these—considered individually—must only produce relatively low forces, since all electromagnets 1 cooperate on a rotation of the plate 10 and the forces produced by them are summed accordingly. This has the result that relatively cost-favorable electromagnets can be used which also have only a comparatively low heat development so that the air cooling system shown in FIGS. 1 and 2 is sufficient for an operation of the rotary indexing table in accordance with the invention.

If a rotary indexing table is required in which the plate 10 is rotatable with lower forces with respect to the base unit 16, some of the electromagnets 1 shown can be omitted without problem. It would, for example, be possible only to provide every second electromagnet 1 shown in FIG. 1. In an extreme case, only two electromagnets 1 are coupled to the base unit 16.

The invention claimed is:

1. A rotary indexing table comprising a stationary base unit and a plate rotatably supported thereon and drivable relative to the base unit by means of a drive, wherein the drive is formed by a plurality of individual drive elements arranged in a circumferential region of the plate, the individual drive elements comprising individual permanent magnets that are uniformly distributed adjacent to one another along the total circumference of the plate and substantially diametrically opposite one another with respect to an axis of rotation of the plate, and the base unit having at least four electromagnets which lie opposite the permanent magnets coupled to the plate.

2. A rotary indexing table in accordance with claim 1, wherein the individual drive elements are acted on by an air cooling system.

3. A rotary indexing table in accordance with claim 2, wherein a respective air cooling element is provided for each half of the individual drive elements arranged in the circumferential region of the plate.

4. A rotary indexing table in accordance with claim 3, wherein the two air cooling elements arranged adjacent to one another and at least one exhaust air aperture are arranged substantially diametrically opposite one another with respect to the axis of rotation of the plate.

5. A rotary indexing table in accordance with claim 1, wherein an encoder is provided for the determination of the relative position between the plate and the base unit.

6. A rotary indexing table in accordance with claim 5 wherein the plate is provided with code markings distributed over its circumference, in particular including at least one reference mark.

7. A rotary indexing table in accordance with claim 5 wherein the base unit is provided with an optical, a magnetic or an inductive sensor for the detection of the code markings.

8. A rotary indexing table in accordance with claim 1, wherein the base unit has a brake unit cooperating with the plate and loaded by compressed air.

9. A rotary indexing table in accordance with claim 8, wherein the brake unit is in its state permitting a rotation of the plate when the compressed air load is present.

10. A rotary indexing table in accordance with claim 1, wherein the plate and the base unit are each made in ring shape, with the central openings of the plate and of the base unit being substantially aligned with one another.

11. A rotary indexing table in accordance with claim 1, wherein the plate is rotatably supported on the base unit via a wire four-point bearing.

* * * * *